United States Patent [19]

Braden et al.

[11] Patent Number: 4,931,191

[45] Date of Patent: Jun. 5, 1990

[54] METHOD FOR SEPARATING SOLIDS FROM WATER USING AMINE CONTAINING POLYMERS

[75] Inventors: Michael L. Braden; Stephen J. Allenson, both of Richmond, Tex.

[73] Assignee: Nalco Chemical Company, Naperville, Ill.

[21] Appl. No.: 296,638

[22] Filed: Jan. 13, 1989

[51] Int. Cl.$^5$ ................................. C02F 1/56
[52] U.S. Cl. ................................. 210/725; 210/705; 210/708; 210/734; 210/735
[58] Field of Search ............... 210/725, 727, 728, 732, 210/734, 735, 708, 705; 252/341, 358

[56] References Cited

U.S. PATENT DOCUMENTS

| | | | |
|---|---|---|---|
| 3,493,501 | 2/1970 | Eck | 210/735 |
| 4,154,698 | 5/1979 | Doft | 210/708 |
| 4,318,956 | 3/1982 | Stevens et al. | 427/393.4 |
| 4,454,047 | 6/1984 | Becker et al. | 210/708 |
| 4,715,962 | 12/1987 | Bhattacharyya et al. | 210/708 |
| 4,734,274 | 3/1988 | Allenson | 423/265 |
| 4,741,835 | 5/1988 | Jacques et al. | 210/708 |

Primary Examiner—Peter Hruskoci
Attorney, Agent, or Firm—Anthony L. Cupoli; Donald G. Epple

[57] ABSTRACT

A method for clarifying water by liquid/solid separation comprising dosing the water to be clarified with a copolymer produced by the emulsion polymerization of only hydrophobic monomers where at least one hydrophobic monomer is an amine containing monomer which is hydrophobic when the amine is neutral and hydrophilic when the amine is salified.

11 Claims, No Drawings

METHOD FOR SEPARATING SOLIDS FROM WATER USING AMINE CONTAINING POLYMERS

FIELD OF THE INVENTION

The invention is in the field of solids/liquids separation.

BACKGROUND OF THE INVENTION

Solids/liquids separation is an art which has been practiced for centuries. Traditionally, solids have been removed from liquids such as water for purposes of clarifying the liquid. Separation is effectuated using agents such as coagulants, flocculants, or combinations of coagulants and flocculants.

Traditionally, these agents have been water soluble. They have been added by one of the following methods: by dissolving the polymer in water and adding the resulting solution to the water to be clarified, or by suspending a water soluble polymer containing hydrophilic monomers in an oil external phase dispersion or emulsion which is inverted in the water to be clarified.

The use of aqueous solutions of a polymer present a number of difficulties. The most significant being that the solution many times becomes extremely viscous with even low concentrations of polymer. Concentrations in excess of 1 or 2 weight % may be impossible to feed.

Oil external systems also have many disadvantages. Oil is immiscible with water. When the polymer in oil is spilled onto a wood surface it creates both a fire hazard and a slip and fall hazard. Additionally, these systems have a tendency to promote gellation of the polymer. When this happens, the polymer gel is not available to the system being treated. Thus under-feeding and, unexpected, inferior treatment can result.

Other disadvantages of oil dispersed polymers (i.e. oil continuous phase polymers) exist. They usually become increasingly more viscous upon aging. Viscosity hinders the application of the polymer to the system.

Also oil splits occur. That is the oil external dispersion in time will separate, the dispersed polymer will settle to the bottom of the vessel and the oil layer will rise to the top.

It would be advantageous to develop a polymer composition and method of feeding that composition which would overcome the above difficulties presently experienced. In particular, it would be advantageous to use a method in which a relatively high concentration of polymer can be added to the system being treated for solids/liquids separation. It would be advantageous to provide that polymer in a form where separation from the external phase is minimized. And it would be advantageous to provide that polymer in a form where gellation or viscosity problems are minimized.

SUMMARY OF INVENTION

The inventors have overcome the above problems by developing a polymer which they have produced by the emulsion polymerization of hydrophobic monomer in a water external latex.

In one embodiment of the invention, where only one hydrophobic monomer is utilized. That hydrophobic monomer must be an amine containing monomer which is hydrophobic when the amine is neutral and hydrophilic when the amine is salified.

In another embodiment of the invention where more than one hydrophobic monomer is utilized, at least one of the hydrophobic monomers must contain an amine which is hydrophobic when the amine is neutral and hydrophilic when the amine is salified.

The amine containing polymer is added to the water being treated. When added to the water of this invention, it becomes salified and solubilized in the water.

The polymers produced by this method generally have a molecular weight of at least two million. The particle size of the polymer will fall generally within the range of 0.005 to 0.5 microns; although a particle size of approximately 0.1 to 0.2 is most preferred.

These polymers are further characterized as containing at least 30% hydrophobic amine containing monomer. Most preferably, the polymer will contain at least 40 % hydrophobic amine containing polymer.

Generally, the polymer will be added to the system as a latex. However, it is possible to first dissolve the polymer in water and feed the polymer to the system as a solution polymer.

The polymer will remain in the emulsion form as long as the effective pH of the polymer in the oil phase of the emulsion, is greater than 8. It is understood, that the pH of an oil phase cannot be directly taken. However, if the system is inverted, and the pH taken, the resultant pH will be approximately 8 or greater.

That is, if the polymer is to remain in emulsion form, it is important that the pH of the water phase remain at or above approximately pH 7. If the pH of the water phase falls below approximately pH 7, the hydrophobic polymer will become salified. Once salified, the polymer will commence dissolving in water, and the emulsion will break.

The emulsion will break when added to water to be treated because of dilution of the continuous phase. The pka for the salified amine is so low that salification will occur upon dilution with water. As salification continues, the polymer becomes less and less coiled. The salified polymer becomes more extended as it becomes increasingly more charged. The salified polymer thus becomes available for disrupting the solid/liquid interface for effectuating solids/liquid separation.

The Polymers

The polymers are produced by the emulsion polymerization of hydrophobic monomer in a water external latex. The polymer must include an amine containing monomer which is hydrophobic when the amine is neutral and hydrophilic when the amine reacts with acid to form an amine salt. (i.e. when the amine is salified). Such amine containing monomers can be ascertained by those skilled in the art. Included among the suitable monomers are dimethylaminoethyl methacrylate, dimethylaminopropyl methacrylamide, diallylamine, diethylaminoethyl methacrylate, dimethylamino ethyl acrylate, diethylaminoethyl acrylate and N,N diallylcyclo hexylamine, The polymers can also include non-amine containing hydrophobic monomers. Such monomers can be ascertained by one skilled in the art without undue experimentation. Included among the suitable hydrophobic monomers are butyl acrylate, ethyl acrylate, methyl methacrylate, lauryl acrylate, stearic methacrylate and styrene.

The Emulsifiers

Emulsifiers (including emulsifier mixtures) suitable performing oil-in-water emulsions can be used in preparing the polymers of this invention, or in preparing a latex containing those polymers. Such emulsifiers generally have an HLB greater than 8 and most preferably having an HLB within the range of 8 to 18. Suitable emulsifiers can readily be determined by those skilled in the art. The term HLB and the method of determining suitable emulsifiers are discussed in the March 1980 ICI Americas, Inc. publication entitled "The HLB System a Time Saving Guide to Emulsifier Selection."

The Initiators

Initiators for emulsion polymerization are well known and suitable initiators for preparing the polymers of the invention can be readily ascertained by those skilled in the art. Thermal and/or redox initiators are most preferred. But other types of initiators can be used.

Preparation of the polymers

PROCEDURE AA

Below is a typical emulsion polymerization procedure using AMP as the catalyst.

| Materials Needed | Percentage |
| --- | --- |
| A. Water | 76.36 |
| Triton X-405 | 1.71 |
| Sodium Lauryl Sulfate | 0.93 |
| B. DMAEM (45 mole %) | 11.33 |
| Ethylacrylate (27.5 mole %) | 4.33 |
| Methyl methacrylate (27.5 mole %) | 4.34 |
| C. Ammonium persulfate (10% in water) | 0.33 |
| D. Sodium meta-bisulfite (5% in water) | 0.67 |

1. Charged items listed in (A) to a 500 ml round bottom flask equipped with an overhead stirrer, nitrogen purge, and thermometer.
2. Started stirring at moderate speed.
3. To a separate beaker, combined items listed in (B).
4. Added CONTENTS in beaker to flask. A milky white mixture resulted.
5. Started nitrogen purge. (Caution! Foaming will occur if the flow rate of the nitrogen gas is too high.)
6. Heated to 30 degrees C.
7. Added (C). Stir for 15 seconds.
8. Added (D). Temperature began to rise to five minutes after the addition of (D). Temperature reached a maximum of 50 degrees C.
9. Stirred for 4 hours.
10. Transferred finished product to a storage container.

The product was a milky white latex with a bluish cast and did not settle out.

PROCEDURE B

The following emulsion polymerization procedure was used when Vazo 67 catalyst was used to initiate the reaction.

| Materials Needed | Percentage |
| --- | --- |
| A. Water | 76.36 |
| Triton-405 | 1.71 |
| Sodium Lauryl Sulfate | 0.93 |
| Vazo 67 | 0.01 |
| B. DMAEM (45 mole %) | 11.33 |
| Ethylacrylate (27.5 mole %) | 4.33 |
| Methyl methacrylate (27.5 mole %) | 4.34 |
| C. Ammonium persulfate (10% in water) | 0.33 |
| D. Sodium meta-bisulfite (5% in water) | 0.67 |

1. Charged items listed in (A) to a 500 ml round bottom flask equipped with an overhead stirrer, nitrogen purge, addition funnel, reflux condenser, and thermometer.
2. Started moderate stirring.
3. Started nitrogen purge. (CAUTION! Foaming will occur if the flow rate of the nitrogen gas is too high.)
4. Heated to 60 degrees C.
5. Added to the addition funnel items listed in (B).
6. At 60 degrees C., started addition of monomers. Added over a three hour period.
7. After addition, continued heating for 1 hour at 60 degrees C.
8. Cooled.
9. Transferred finished product to a storage container.

Vazo 67 is a trademark of the Dow Chemical Company for a free radical initiator.

The product was a milky white latex with a bluish cast and did not settle out. Test for residual DMAEM ethyl acrylate and methyl methacrylate proved negative.

The molecular weight of the cationic water external latex polymers made from ethylacrylate, methyl methacrylate and dimethylaminoethyl methacrylate was around 2.5 million. The average particle size was approximately 0.15 microns. The viscosity of the product was 5 cps measured on a Brookfield viscometer with a #1 spindle, @30 rpm at 25 degrees F. The product had a pH within the range of 8 to 9. Upon lowering the pH to 3 with ten percent hydrochloric acid, the product became clear and highly viscous.

U.S. Pat. No. 4,318,956, by Rohm and Haas Company, which teaches another procedure for making water external latex polymers and is hereby incorporated by reference.

List of Polymers Tested

The polymers tested show that hydrophobic polymer having from 30-100 mole percent amines work well. The following amines were prepared according to emulsion Procedures A or B described and were evaluated in the oil-in-water emulsion form, unless otherwise indicated:

| | | |
| --- | --- | --- |
| A1 | EA/DMAEM | 55/45 |
| A2 | MMA/DMAEM | 55/45 |
| A3 | BA/DMAEM | 55/45 |
| A4 | IBA/DMAEM | 55/45 |
| B1 | DEAEM/DMAEM | 55/45 |
| B3 | DEAM/DMAEM | 48/52 |
| C1 | DEAEM | 100 |
| D1 | EA/MMA/DMAEM | 27.5/27.5/45 |
| E1 | EA/DMAEM | 65/25 |
| E6 | BA/DMAEM | 60/40 |
| E7 | BA/DMAEM | 65/35 |
| E8 | BA/DMAEM | 70/30 |
| E9 | BA/DMAEM | 55/45 |

List of Polymers Tested

| | | | |
|---|---|---|---|
| A | 4 | iBA/DMAEM | 55/45 |
| B | 2 | DEAEM/DMAEM | 50/50 |
| D | 2 | EA/MMA/DMAEM | 27.5/27.5/45 |
| D | 3 | " | 50/5 |
| D | 4 | " | 45/90/45 |
| D | 5 | " | 42/13/45 |
| D | 6 | " | 5/50/45 |
| D | 7 | " | 15/40/45 |
| D | 8 | " | 10/45/45 |
| D | 9 | " | 20/35/45 |
| D | 10 | " | 25/30/45 |
| D | 11 | " | 30/25/45 |
| E | 2 | EA/DMAEM | 60/40 |
| E | 3 | MMA/DMAEM | 70/30 |
| E | 4 | " | 65/35 |
| E | 5 | " | 60/40 |
| E | 10 | EA/DMAPMA | 55/45 |
| E | 11 | " | 60/40 |
| E | 12 | " | 65/35 |
| E | 13 | EA/DMAEA | 55/45 |
| E | 14 | " | 60/40 |
| E | 15 | " | 65/35 |
| E | 16 | " | 70/30 |
| E | 17 | MMA/DMAEM | 55/45 |
| E | 18 | " | 60/40 |
| E | 19 | " | 65/35 |
| E | 20 | " | 70/30 |
| E | 21 | BA/DMAEA | 55/45 |
| E | 22 | " | 60/40 |
| E | 23 | " | 65/35 |
| E | 24 | " | 70/30 |
| E | 25 | MMA/Diallylamine | 50/50 |
| $F_1$ | | EA/MAA | 35/65 |
| $F_3$ | | AcAM/AA | 80/20 |
| $G_1$ | | AcAM/DMAEA | 55/45 |
| $G_3$ | | AcAM/DMAEM | 55/45 |
| $G_6$ | | AcAM/DMAEM-MSQ | 68/32 |
| $H_1$ | | $NaAlO_2$ | 48 |
| $H_5$ | | Aniline/Formaldehyde | 94/56 |

Glossary

| | |
|---|---|
| MAA = | Methacrylic Acid |
| AcAM = | Acrylamide |
| AA = | Acrylic Acid |
| DMAEM-MSQ = | Dimethylaminoethyl methacrylate-methyl sulfate quat |
| $NaAlO_2$ | Sodium Aluminate |

Glossary of Abbreviations

| | |
|---|---|
| BA = | Butyl acrylate |
| DMAEM = | Dimethylaminoethylmethacrylate |
| EA = | Ethyl acrylate |
| iBA = | Isobutylacrylate |
| DMAPMA = | Dimethylaminopropyl methacrylamide |
| MMA = | Methyl methacrylate |

WATER CLARIFICATION TESTS

INDUCED AIR FLOTATION TEST

The induced air flotation test differs from other tests in the equipment being used and the amount of agitation. This test was designed for use where air induced flotation devices are providing the water clarification.

Fresh samples were obtained with each series of TESTS. 1% coagulation solutions were accurately made up so that concentrations could be effectively controlled.

2500 ml of water to be clarified was dosed with 1% coagulant solution after one minute of mixing, notes were made of the foam, the oil on the surface, the amount of overflow and the floc on the surface of the sample. Water was withdrawn from the bottom of the mixture and the oil content and the clarity of the water were noted.

As with all the tests, the polymer was compared against the product that was being used to clarify the water sampled commercially.

If the times on the above test did not reflect what was occurring in the system, adjustments were made to simulate the system.

BOTTLE TEST PROCEDURE

Several tests were used to evaluate the new cationic WELS, (i.e. water external latexes) these are described below.

A. Ratio Test

1. Collected a chemical free sample of producing water containing the dispersed oil.
2. Filled 6 bottles to the 100 ml mark with freshly collected sample and inverted several times.
3. By means of an Eppendorf syringe, pipetted 0.05 (5 ppm), 0.10 (10 ppm), 0.15 (15 ppm), 0.20 (20 ppm), 0.50 (50 ppm) ml of the 1% test solution to the dispersion in the bottles (Bottle 6 is a blank).
4. Capped the bottles and agitated 30–50 slow rolls. Set bottles on flat surface and observe water clarity and flocculation. Record observations on bottle test sheet.
   a. A numerical system of 1 through 10 was used to rate the bottles. A (1) represents the best in water quality, speed and degree of coagulation and (10) the worst.
5. Agitated bottles again. This time gave the bottles 50–100 vigorous rolls or shakes. Set bottles on flat surface and again observed and recorded on the bottle test sheet the clarity of the water and the speed and degree of coagulation.

B. Elimination Test

1. From the Ratio Test Results selected a chemical ratio that showed the first signs of clarification but did not treat completely. (This ratio was used to evaluate chemicals included on the Elimination Test.)
2. Obtained fresh fluid sample from same point as sample for Ratio Test was obtained. Followed the same procedure as in the Ratio Test except that the various formulas was injected at the chemical ratio rather than one formula at several ratios.
3. Observed results and recorded on the bottle test sheet.
4. Selected the best three chemicals for further evaluation in the Confirmation Test.

C. Confirmation Test

The Confirmation Test was run similarly to the Ratio and the Elimination Tests except that only the three best formulas selected from the Elimination Test were used. The test was run on a fresh sample using two ratios below and one ratio above the level at which the Elimination Test was run. The coagulant or flocculant giving the cleanest water, the tightest and fastest coagulation, and widest treating range was selected.

TESTS

Solid/liquid separation testing procedures were conducted on a number of different types of water systems. The testing procedures described above were utilized. The tests are reported below.

In each set of tests, the first test reported is labelled Standard (STD). The Standard was the chemical being used to treat that water on a commercial basis. That chemical was chosen as a standard because it was assumed that the user selected it as the optimal chemical for treatment desired.

Test Results Petrochemical Plant Influent

Influent water to a petrochemical plant producing ethylene was treated. The water was from a near-by retention pond and containing aerobic waste, biological waste, suspended solids (both organic and inorganic suspended solids.) The solids were separated from the water. The induced air floatation test procedure was utilized in Test I.

| | | Test I | |
|---|---|---|---|
| Chemical | PPM | Polymer ppm Active | Water |
| Std (G$_1$) | 15 | 5.6 | 1 |
| E$_6$ | 15 | 3.0 | 3 |
| E$_7$ | 15 | 3.0 | 3 |
| E$_1$ | 15 | 3.0 | 1 |
| A$_1$ | 15 | 3.0 | 1 |
| B$_1$ | 15 | 3.0 | 1 |

The air induced flotation test procedure was used in the Test II.

| | | Test II | |
|---|---|---|---|
| Chemical | PPM | Polymer ppm Active | Water |
| Std (G$_1$) | 30 | 11.2 | 1 |
| E$_8$ | 30 | 6.0 | 3 |
| A$_3$ | 30 | 6.0 | 3 |
| C$_1$ | 30 | 6.0 | 3 |
| E$_3$ | 30 | 6.0 | 1 |

1 = outstanding water clarity
3 = good water clarity

In the test reported above the results for the amine containing compositions E$_1$, A$_1$, and B$_1$ showed an improvement of approximately 55% on a dosage basis. This is a significant improvement over the standard utilized.

Amines E$_6$ and E$_7$ provided good water clarity, although the results were not quite as good as the Standard. However, consider the fact that both these amines had only half the part per million actives of the standard, the resuts are better than the test indicates.

Amines, E$_8$, A$_3$ and C$_1$, had approximately the same activity as the Standard. These three amines provided good water clarity. And, that water clarity would e acceptable on a commercial basis. However, the results were not as good as those provided by the Standard.

GULF OF MEXICO BAY WATER

Gulf of Mexico Bay Water was tested. This saline water was tested using the Elimination test as described below:

| Code | ppm Used | ppm Active | W | F |
|---|---|---|---|---|
| F$_1$ | 2 | .36 | 3 | 4 |
| Std (G$_6$) | 2 | .5 | 2 | 2 |
| B$_3$ | 2 | .4 | 2+ | 2+ |
| A$_2$ | 2 | .4 | 2 | 2 |
| D$_1$ | 2 | .4 | 2 | 2 |
| Std (G$_6$) | 6 | 1.5 | 2 | 1 |

-continued

| Code | ppm Used | ppm Active | W | F |
|---|---|---|---|---|
| B$_3$ | 6 | 1.2 | 1− | 1 |
| A$_2$ | 6 | 1.2 | 1− | 1− |
| D$_1$ | 6 | 1.2 | 1− | 2+ |

B$_3$ and A$_2$, had a greater than 250% improvement over Std.

D$_1$, had greater than 20% improvement over the Standard.

F$_1$ exhibited results slightly worse than the Standard but the F$_1$ dosage was lower.

Frac Truck Washing

Frac trucks are tank trucks filled with the water that is used to fracture the subterranean formations required to permit the recover of oil. The exterior of these trucks become caked with oil, oil field mud, surfactants used in the frac truck water, and other debris.

The waste water produced when washing the exterior of these trucks containing all these items. That waste water was treated using the above tests.

Three tables are presented below. The first two represent bottle tests. All the tests in the first two are primarily screening tests. However, the first set of results is labelled "ratio test" and the second the "elimination test". The elumination test results provide those materials which appear to have greater utility. The bottle test results in the third table labelled confirmation tests were conducted to confirm the results of the elimination tests for the most preferred solid/liquid separating compositions.

Frac Tank Washing

Ratio Test

| Code | ppm Used | ppm Active | Water | Floc |
|---|---|---|---|---|
| H$_1$ | 50 | 15 | 10 | 10 |
| H$_5$ | 50 | 14 | 10 | 10 |
| F$_3$ | 50 | 17.5 | 10 | 10 |
| F$_1$ | 80 | 14.4 | 8 | 10 |
| E$_9$ | 80 | 16 | 8 | 10 |
| C$_1$ | 80 | 16 | 8 | 5 |
| *G$_3$ | 90 | 20 | 5 | 2+ |

*There was no standard chemical for comparison, since the frac truck company was not using Chemical. We then selected our "standard" as G$_3$ for comparing our water external latex polymer.

H$_1$, H$_5$, F$_1$, E$_9$, and C$_1$ were eliminated from further testing on the basis of the work as well as the standard is to be expected. Each solid/liquid system is slightly different and different compositions within the polymers of this invention will improve or worsen in performance relative to each other based on the system to be treated. Some routine screening tests within the class may have to be performed to determine the best polymer for optimization for each water being treated.

Frac Tank Washing

Elimination Test

| Code | ppm Used | ppm Active | Water | Floc |
|---|---|---|---|---|
| Std (G$_3$) | 80 | 20 | 5 | 2+ |
| A$_2$ | 80 | 16 | 1− | 3+ |
| B$_3$ | 80 | 16 | 3 | 3 |
| A$_3$ | 80 | 16 | 3 | 3 |

-continued

| Code | ppm Used | ppm Active | Water | Floc |
|---|---|---|---|---|
| $A_1$ | 80 | 16 | 8 | 8 |

$A_2$, $A_3$ and $B_3$ performed well. $A_1$ did not.

Frac Tank Washing
Conjunction Test

| Code | ppm Used | ppm Active | Water | Floc |
|---|---|---|---|---|
| St ($G_3$) | 160 | 40 | 5 | 2+ |
| $A_2$ | 160 | 32 | 1 | 2 |
| $B_3$ | 160 | 32 | 1− | 3+ |

The tests above show that the amines $A_2$ and $B_3$ have greater than 250% improvement over the standard.

Having now described out invention, we claim as follows:

1. A method for clarifying water by liquid/solid separation comprising treating the water with an effective clarifying amount of an oil-in-water emulsion containing a polymer produced by the emulsion polymerization of only hydrophobic monomers, where at least one hydrophobic monomer is an amine containing monomer present in the polymer at at least 40 mole percent of total monomer and capable of reacting with acid to form an amine salt thereby becoming hydrophilic, breaking said emulsion and dissolving said polymer in said water at a pH below about 7, and then coagulating/flocculating the solids/oils in the water being treated with said polymer, and separating the solids/oils from the water to form a clarified water.

2. The method of claim 1 for clarifying water comprising treating the water to be clarified with a polymer produced by emulsion polymerization of only hydrophobic monomers which contain an amine.

3. The method of claim 1 wherein said emulsion contains a polymer having only hydrophobic monomers, where at least one hydrophobic monomer is an amine containing monomer, present in 45–100 mole percent of total monomer.

4. The method of claim 3 wherein the polymer of the emulsion has a molecular weight of at least 2,000,000.

5. The method of claim 1 wherein the polymer of the emulsion has at least 45 mole percent hydrophobic amine containing monomer.

6. The method of claim 5 wherein the polymer produced by emulsion polymerization has an average particle size within the range of 0.05 to 0.5 microns; and the pH of the polymer emulsion is greater than eight.

7. The method of claim 1 comprising treating the water with at least 0.5 ppm of the oil-in-water emulsion formed by the emulsion polymerization of at least one of hydrophobic amine containing monomer selected from the group consisting of Dimethylaminoethylmethacrylate
Diethylaminoethylmethacrylate
Dimethylaminoethylacrylate
Diethylaminoethylacrylate
Dimethylaminopropylmethacrylate
Dimethylaminopropylacrylamide
Dimethylaminoethylacrylamide
Diethylaminoethylacrylamide
N,N-Diallylcyclohexylamine
Diallymethylamine
Dimethylaminoethylmethacrylamide
Diethylaminoethylmethacrylamide and optionally a hydrophobic monomer from the group consisting of ethyl acrylate, methyl methacrylate, butyl acrylate, isobutylacrylate, stearyl methacrylate lauryl acrylate, and styrene.

8. A method for clarifying water by liquid/solid separation comprising treating the water with an effective clarifying amount of a solution polymer from an oil-in-water polymer emulsion produced by the emulsion polymerization of only hydrophobic monomers, where at least one hydrophobic monomer is an amine-containing monomer present in the polymer at at least 40 mole percent of total monomer and capable of reacting with acid to form an amine salt, thereby becoming hydrophilic, which polymer emulsion is added to water, breaking said emulsion and dissolving said polymer in water at a pH below about 7 to form said solution polymer, and then adding the solution polymer and coagulating/flocculating the solids/oils in the water being treated with the solution polymer, and separating the solids/oils from the water to form a clarified water.

9. The method of claim 8 wherein the solution polymer has a molecular weight of at least 2,000,000.

10. The method of claim 9 wherein the solution polymer contains at least 45–100 mole percent hydrophobic amine-containing monomer.

11. The method of claim 8 wherein the solution polymer contains at least one of a hydrophobic amine containing monomer selected from the group consisting of Dimethylaminoethylmethacrylate
Diethylaminoethylmethacrylate
Dimethylaminoethylacrylate
Diethylaminoethylacrylate
Dimethylaminopropylmethacrylate
Dimethylaminopropylacrylamide
Dimethylaminoethylacrylamide
Diethylaminoethylacrylamide
N,N-Diallylcyclohexylamine
Diallymethylamine
Dimethylaminoethylmethacrylamide
Diethylaminoethylmethacrylamide and optionally a hydrophobic monomer from the group consisting of ethyl acrylate, methyl methacrylate, butyl acrylate, isobutylacrylate, stearyl methacrylate lauryl acrylate, and styrene.

* * * * *